No. 636,935. Patented Nov. 14, 1899.
G. WOLKE & H. D. EASTERLY.
VAPOR LAMP.
(Application filed Feb. 14, 1899.)
(No Model.)
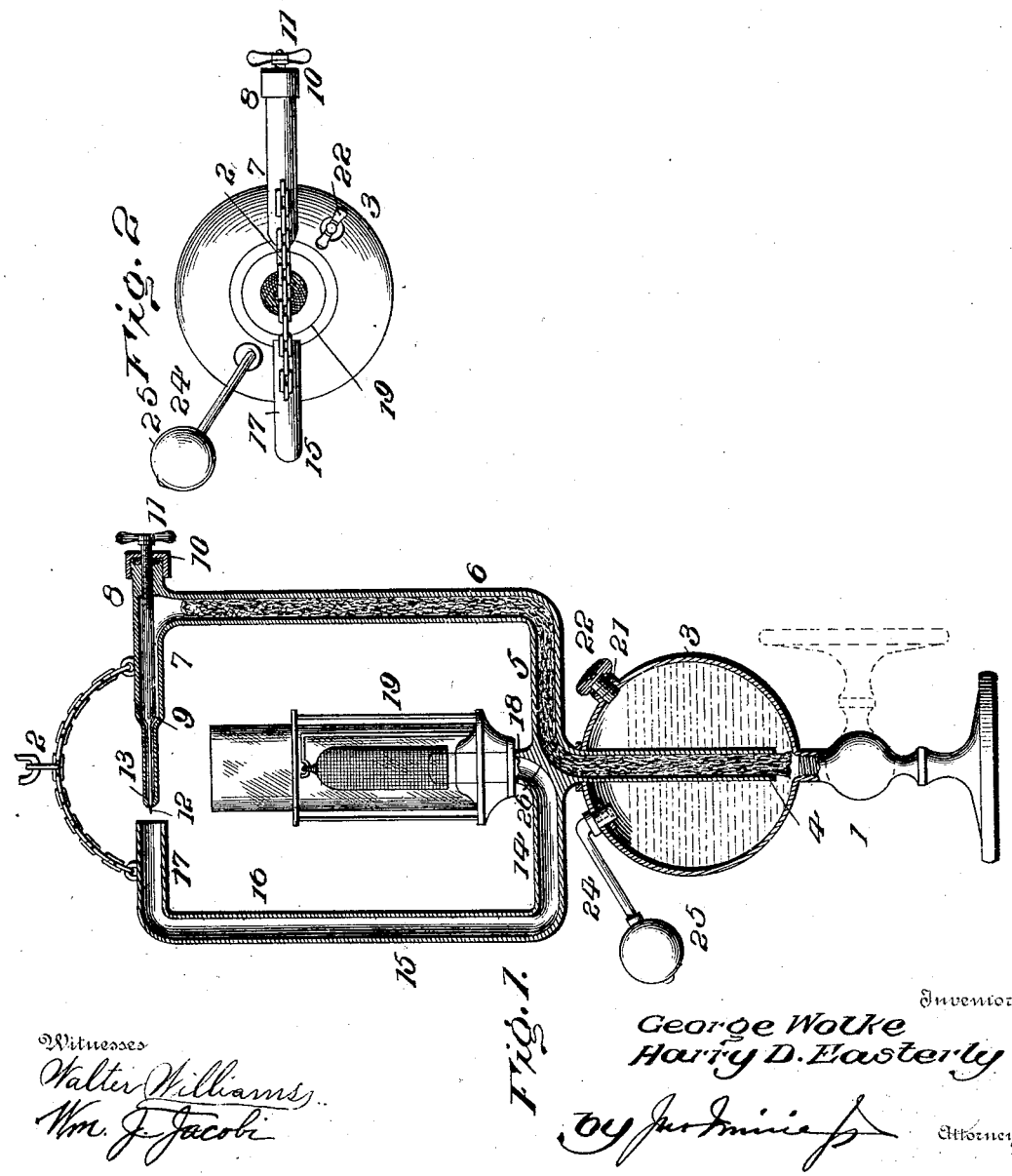
Witnesses
Walter Williams
Wm. J. Jacobi
Inventor
George Wolke
Harry D. Easterly
Attorney

UNITED STATES PATENT OFFICE.

GEORGE WOLKE AND HARRY D. EASTERLY, OF JACKSONVILLE, ILLINOIS.

VAPOR-LAMP.

SPECIFICATION forming part of Letters Patent No. 636,935, dated November 14, 1899.

Application filed February 14, 1899. Serial No. 705,503. (No model.)

*To all whom it may concern:*

Be it known that we, GEORGE WOLKE and HARRY D. EASTERLY, citizens of the United States, residing at Jacksonville, in the county of Morgan and State of Illinois, have invented new and useful Improvements in Vapor-Lamps, of which the following is a specification.

This invention relates to an improved gasolene-lamp, and especially to that class wherein the vapor from the gasolene is drawn up by capillary attraction to a point where the gas is generated and directed to and through a pipe to the burner, the burner after the lamp is started performing a double function—viz., lighting and heating the vapor to generate gas.

The object of this invention is to produce a lamp which is simple in construction, effective in operation, and one capable of being handled by the most unskilled individuals. The manner in which we produce these results and the details necessary to carry them out will be described, and pointed out in the claim.

In the drawings, Figure 1 is a view of our improved lamp. Fig. 2 is a plan view thereof.

The same numerals refer to like parts in both figures.

1 indicates a support which may be formed as shown in full lines or may be a wall-bracket, as shown in dotted lines, or, if so desired, the lamp can be supported by a chain from the ceiling, as indicated at 2. However, the question of support forms no special part of our invention. Sufficient to say, any well-known means may be employed.

A tank 3, preferably in the form of a globe, is provided, into the upper part of which enters and extends to within a short distance of the bottom the fluid-conducting tube 4. The tube and arrangement thereof form a very important part of this invention. The tube is bent at an angle just outside the tank, as at 5, then given another bend in a vertical direction, as at 6, and then bent in at the top, as at 7. This portion 7 forms the retort and has a slight extension 8 in the opposite direction to provide for a needle-valve 9 and stuffing-box 10. The needle-valve is of ordinary construction, having the usual finger-piece 11 and reduced needle-point 12, the latter fitting in a valve-seat 13 at the inner reduced end of the pipe section or retort 7. Extending in an opposite direction to the bend 5 of the conducting-tube 4 and on a plane to the same is the integrally-formed horizontal tubular portion 14 of a gas-supply pipe 15, which has a vertical portion 16 and an upper inturned or horizontal portion 17. The inner end of the lower horizontal portion is extended up to form a short vertical section 18, to which is applied the burner 19. The inner end of the upper section 17 is open, and the end of the needle-valve is presented to said open end.

The ends of the chain 2 are secured to the upper ends of the pipes, as clearly shown.

The tank 3 is provided with a filling-opening 21 and a cap 22. This opening is situated slightly below the top of the tank, so as to provide an air-space. A check-valve is also provided in the upper part of the tank and has connected to it a short section of pipe 24, having a bulb 25 at the outer end to be used for forcing air into the tank to force the gasolene out, as shown.

A wick is placed in the conducting-pipe, so as to conduct the gasolene up to and within the valve chamber or retort.

By reference to the drawings it will be seen that the pipes are practically one, the upper part, or that above the tank, forming a burner frame or support. The lower T end is screwed into the tank and affords means for conducting and limiting the amount of vapor, the two passage-ways being separated by a partition 26. This manner of constructing the frame of the lamp is extremely simple and practical, forming a rigid structure throughout, and especially at the point of union of the tubes 5 and 14, at which point they are formed integral, as by casting or otherwise. This we consider as being an essential and important feature of our invention.

The operation of the lamp, it is thought, will be readily understood. The gasolene is carried by capillary attraction and by force of the air in the top of tank to and through the wick, the vapor accumulating in the retort. Before lighting the lamp the needle-valve is opened and the bulb is squeezed several times, forcing the vapor through the conducting-tube and out through the valve-opening into the open end of the pipe-section 17 and thence to the burner. A light is now applied, whereupon the flame will heat the retort or valve chamber and the vapor therein, causing a generation of gas, which passes through the pipe 16 to the burner.

Having thus described our invention, what we claim is—

In a gas-generating lamp, the combination with an oil-tank, of an oil-conducting pipe having a connection with the tank and extending therein to near its bottom, said pipe being directed outward in a horizontal direction at the point where it leaves the tank, and then extended upward in a vertical direction and having its extremity reduced in diameter and directed inward in a horizontal plane immediately above and parallel with the lower horizontal portion of the pipe, said reduced end being provided with an opening and a needle-valve coöperating therewith, and a gas-conducting pipe formed integral with the said oil-pipe at the point where the latter leaves the tank and provided with a short upwardly-extending central portion adjacent to its point of connection with the said oil-pipe, and horizontally and vertically extending portions arranged diametrically opposite the corresponding portions of the oil-conducting pipe, the extreme end of said vertical portion of the gas-pipe being open and directed inward and terminating at a point adjacent to the said needle-valve opening in the oil-conducting pipe, and a burner carried by the said short upwardly-extending portion of the gas-pipe and located directly below the said contracted portion of the oil-conducting pipe, the parts being arranged and coöperating substantially as described.

In testimony whereof we have hereunto set our hands in the presence of the subscribing witnesses.

GEORGE WOLKE.
HARRY D. EASTERLY.

Witnesses to George Wolke:
  CHAS. A. BARNES,
  J. MARSHALL MILLER.
Witnesses to Harry D. Easterly:
  H. W. ENGLISH,
  F. D. MCAVOY.